April 15, 1930. V. A. HÉNOCQUE ET AL 1,754,950

PROCESS AND APPARATUS FOR OBTAINING NEW RADIATIONS

Filed Dec. 13, 1924 4 Sheets-Sheet 1

Inventors
Victor Albert Hénocque
and Henri Schmidt
per [signature]
Attorney.

Inventors
Victor Albert Hénocque
and Henri Schmidt.
per [signature] Attorney.

Inventors.
Victor Albert Hénocque
and Henri Schmidt.
per
Attorney

April 15, 1930.   V. A. HÉNOCQUE ET AL   1,754,950
PROCESS AND APPARATUS FOR OBTAINING NEW RADIATIONS
Filed Dec. 13, 1924   4 Sheets-Sheet 4

Inventors
Victor Albert Hénocque
and Henri Schmidt.
per  Attorney.

Patented Apr. 15, 1930                                                               1,754,950

UNITED STATES PATENT OFFICE

VICTOR ALBERT HENOCQUE, OF LA BASSE-CROISILLE, PAR CONCHES, EURE, AND HENRI SCHMIDT, OF PARIS, FRANCE

PROCESS AND APPARATUS FOR OBTAINING NEW RADIATIONS

Application filed December 13, 1924, Serial No. 755,688, and in France June 5, 1924.

Endeavours have long been made to transmit directionally electrical energy to a distance without making use of a metal conductor. For this purpose certain processes have been proposed based upon the hypothesis that a pencil of ultra-violet radiations was sufficiently conductive to enable it to be utilized for the purpose of obtaining this result.

Experience has shown that these ultra-violet radiations are, owing to their rapid damping in the air, incapable of ensuring the transport of electric power to great distances. Only by the production of radiations of shorter wave length and greater penetrative power than the said ultra-violet radiations, will the idea be of any practical use.

The present invention provides a method of and means for effecting the transmission to a distance of energy without any metal conductor, by the production of new conductive radiations, and also for obtaining a large number of the new radiations of short wave length, possessing very energetic physical and chemical properties. These new radiations permit, in particular, of the deflagration at a distance of explosives, the transportation of electric energy without wires or such like conductors, electrocution at a distance, the stimulation of the growth of vegetation, and various other physical and chemical effects.

Broadly the new method consists in obtaining optical resonance in a source of radiation placed in an intense electrical field and in causing in its turn an increase of the intensity of this field by the development of phenomena of electric resonance in the circuit which generates it.

As a matter of fact it is known, according to modern theories as to the constitution of the atom, that the radiations emitted by a body are due to the displacements of the electrons of the orbits belonging either to the external region (luminous radiations, either ultra-violet or infra-red) or to the intermediate region (X-rays), these displacements taking place by reason of shocks. By accelerating the speed at which the atoms are animated in their usual agitation, radiations of a more or less short wave length are produced.

This acceleration can be obtained by an increase of temperature. Carbon for example which is black at the ordinary temperature, begins to emit infra-red radiations when it is heated, then radiations of a more and more bright red in proportion as the temperature increases, until it gives a brilliant white light. It even emits, in the electric arc, invisible ultra-violet radiations of short wave length.

The increase in temperature is not the only factor in producing this acceleration of the atomic agitation; an increasing electrical field ensures the same effect. On subjecting a source of radiations, say an incandescent wire for example, to an increasing electrical field, there will be observed an emission of radiations with an increasing shortness of wave length; this is what is termed the optical resonance.

A phase of this action is marked by ionization, that is to say by the liberation of electrons detached from the external orbit and rendering the air conductive. Undoubtedly however, the intensity of the electromagnetic field produced by the phenomenon of electric resonance induces much more serious perturbation in the structure of the atom subjected to the influence, when radiations capable of causing the deflagration of explosives at a distance are emitted by this latter.

Electric resonance is easy to produce, owing to the well known relationship between the magnitude of the self induction, of the capacity and of the period of the current.

It furnishes extremely high tensions and, under the influence of the very powerful electromagnetic field which it develops, the luminous source by optical resonance emits certain radiations of very short wave length, provided with considerable ionizing power and other special properties.

The same powerful electric field is developed at the other pole of the electric circuit, at the point where the pencil or group of the radiations projected abuts. At the time of emission of these radiations the discharge takes place with overwhelming force through the conductive group or system.

When, without producing the phenomena of supertension of the electric resonance, we content ourselves with causing an electromagnetic field to act upon a luminous source, we can nevertheless, by optical resonance cause such or such a useful resonance to appear.

By using different sources, by modifying the nature of the bodies which emit the radiations, by varying the nature and, in large proportions, the intensity of the current in the field of which the luminous source is placed, a whole gamut of very rich radiations can be formed producing very varied effects at a short and at a long distance.

The present invention has therefore, for its object a method and means designed to produce radiations which do not exist in a luminous source, and certain of, which, hitherto unknown of, are capable of producing in particular the deflagration of explosives at a distance, the transmission without wires of electric energy, electrocution at a distance, the stimulation of the growth of vegetation, and various other physical and chemical effects.

Generally, the invention consists essentially in the combination:

1. Of a source of electrical energy which sends a current into a circuit a pole of which is connected to earth;
2. Of a metal aerial of suitable form, connected to the other pole of the circuit;
3. Of a source of radiations placed in the electromagnetic field developed by the aerial, the form and the nature of the aerial, those of the source of radiations being also always so chosen as to produce a directed pencil.

Figure 1:
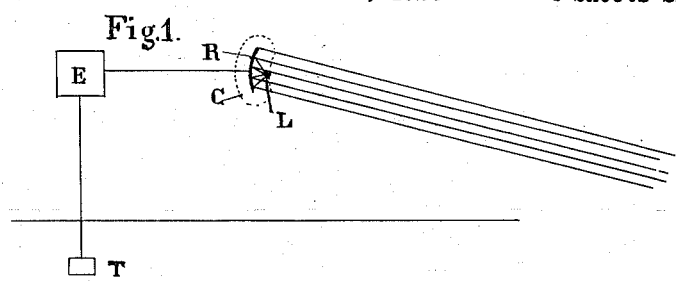
Fig. 1 is a diagrammatic view of one form of the device.

Figure 1 of the accompanying drawing, given by way of example, shows this combination diagrammatically. E is the source of electric energy one pole of which is connected to earth at T. The other pole is connected to an aerial in the form of a reflector R, producing an electromagnetic field C in which is placed a source of radiations L.

This source of radiations may be of various kinds and may consist in particular:

1. Of a gas blowpipe burning at a high temperature and projected on to a simple or compound body, or on to a mixture of bodies capable of emitting, under the conditions of the process, certain useful radiations;
2. Of an electric arc lamp having electrodes of pure carbon, or containing various suitable mineral substances;
3. Of a mercury vapour quartz lamp or a lamp containing suitable metallic vapours;
4. Of a rarefied gas lamp of quartz containing a suitable gas;
5. Of an electric lamp of quartz with metallic filaments;
6. Of a cathode ray tube;
7. Of a compressed mass of various mineral substances which is capable of being rendered instantly inflammable by electrical or mechanical controlling means or even automatically;
8. Of any other suitable source of radiations.

The source, broadly, must be selected according to the nature of the effects which it is desired to produce, according to the distance at which they have to be utilized and according also to the form which it is necessary to give to the apparatus in order to attain the result sought.

The transmitting apparatus, such as the aerial and all the apparatus must be carefully insulated.

If the current in the circuit is an alternating current, the self-induction, the capacity and the period must be such that a phenomenon of resonance so capable of being produced by the current or its harmonics.

If the current is a continuous current, use is made of an interrupter the speed of which is calculated so as to produce on rupture of the circuit, with the capacity and the self-induction, a super-tension of resonance.

The electric resonance may also be produced directly in the circuit which supplies the source L, when it owes its emission of radiations to the electric current.

The resonance is that usually found in electrical engineering and may be produced by any suitable means, some of which are well known.

The new method offers a great variety of applications. Various examples will now be indicated of the effects which can be obtained and of the apparatus capable of producing them.

I. *Long distance effects*

These effects are, *inter alia*, the follows:—
A. Radio-tele-deflagration.
B. Radio-tele-electrocution.
C. Radio-tele-electroculture.
D. Radio-tele-transmission.

Figure 2:
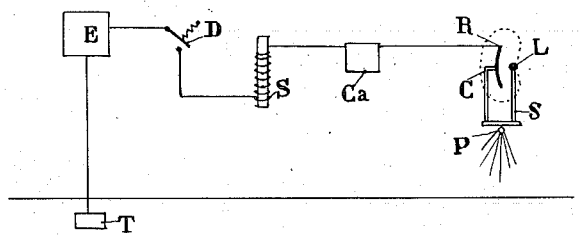
Fig. 2 is a similar view of a modification thereof.

The apparatus designed to produce these different effects may be composed as follows:

A concave metal reflector R (Figure 2) that may be either a revolving one with a parabolic or other generatrix, or an elongated one, that is to say one of cylindrical form, and of parabolic or other profile, is fixed to an insulating support *s* and connected by a metal conductor to the electric circuit.

The curvature of the reflector is calculated so as to obtain the desired form for the pencil of radiations, and to keep the source of the electromagnetic field C.

In front of this reflector is placed a source of radiations L, which in the case of a circular reflector may be in the form of a spot such as a blowpipe lamp, an arc lamp, or the like; or it may be linear or of elongated cylindrical form placed on the axis of the reflector, when this latter is not a circular one, such as a metallic vapour lamp, a rarefied gas lamp or the like, and one or other of the sources may be selected according to the effect which it is desired to obtain.

The source of radiation is carefully insulated; it must be always located in the electromagnetic field C of the aerial.

The electric circuit may be traversed by a continuous or an alternating current.

In the case of a continuous current (Figure 2), with the electrical generator E, one pole of which is connected to earth, there is incorporated an interruptor of variable speed, a self inductance with a soft iron core S, and a capacity Ca. The speed of the interruptor, the self induction and the capacity are calculated with care so that a supertension of the desired intensity can be produced on rupture by extra current.

The capacity is connected directly to the reflector R.

Figure 3:
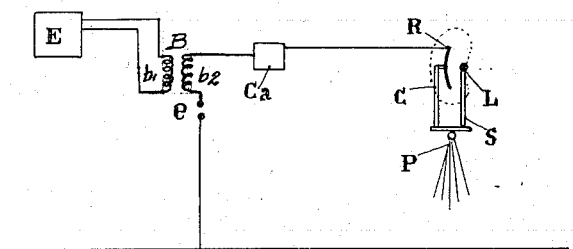
Fig. 3 is a similar view of a second modification of the device.

In the case of an alternating current (Figure 3) the apparatus E for generating the electricity sends its current to the primary $b_1$ of a transformer B. One of the poles of the secondary $b_2$ is connected to a circuit breaker *e* connected to earth, and the other pole is connected to the condenser Ca. The current then flows from the condenser to the reflector R, in the field C of which is placed the source of radiations L.

The size of the capacity, the self induction of the coil and the gap of the circuit breaker are calculated so as to be capable of producing with the period given by the interruptor a super-tension of reasonance.

All these apparatus are carefully insulated.

The reflector and the source of radiations are placed on a support P, movable in all directions, so as to be capable of directing the pencil as desired.

The apparatus works as follows:—

1. *With continuous current.*—The source of radiations is caused to act and the pencil is trained on the object aimed at. The interruptor is closed and the current caused to pass. This latter accumulates an electrical charge in the reflector aerial which develops an increasing electrical field and commences to produce a certain optical resonance. When the apparatus is well charged, the operator produces a rapid rupture of the current by means of the interruptor. A powerful rupture current is generated which increases the intensity of the field to a considerable extent. Now conducting radiations are formed and at this precise moment a very powerful electric current passes into the reflected pencil producing its effects on the bodies which it encounters in its path, making contact with the earth and thus closing the circuit.

2. *With alternating current.*—The source of radiations is caused to act and the pencil is trained on the object aimed at. To secure contact it suffices to run the interruptor at the desired speed, thus sending the current into the primary of the transformer so that there is immediately formed in the secondary circuit a super-tension of resonance which produces by means of the electromagnetic field in which the luminous source is located, a very intense optical resonance. New radiations appear and a devastating current instantly passes into the conducting reflected pencil which completes the circuit at the point where it touches the earth or where it encounters the objects connected to earth.

3. In the case of compressed masses containing mineral substances provided under source No. 7 previously enumerated after having trained the aerial projector at the object aimed at, the electrical apparatus is started up and the aerial projector is charged. When the resonance has reached the necessary intensity, we may, either by an electrical controlling means, or by mechanical means or even automatically, produce the lighting up of the luminous source which at once undergoes the effect of the electromagnetic and optical resonance and instantaneously sets at liberty the conducting radiations which permit the charge to quit the pencil projected on the object aimed at.

Figure 4:
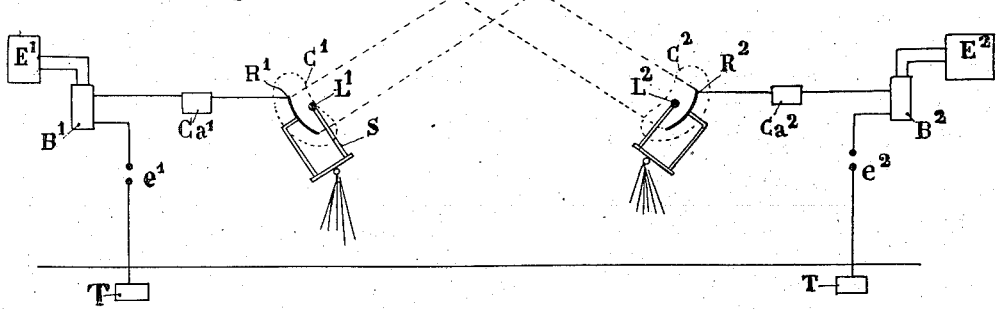
Fig. 4 is a similar view of the device shown in Fig. 3 when used against objects in the air.

To close the circuit on an object which is insulated in the air we may train on to the object the pencil of radiations of a pair of apparatus as shown in Figure 4. This arrangement enables aircraft, birds, and the like to be acted upon.

Figure 5:
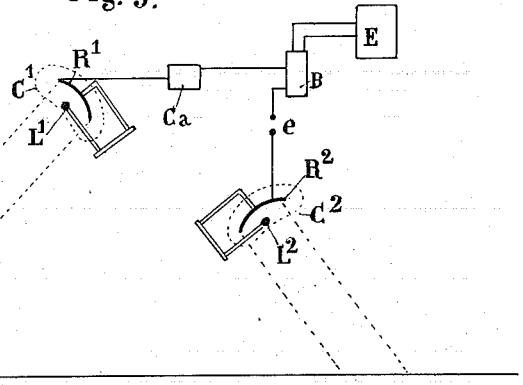
Fig. 5 is a similar view of a modification adapted for use in airplanes.

We may also replace the line passing to earth by a pencil of radiations, in which case it suffices to join to a second pole a reflector $R^2$ (Figure 5), to put a suitable luminous source $L^2$ into its field and to direct this second pencil towards the earth. This latter becomes a conductor under the same conditions as the first one and the circuit with the earth is thus completed. This apparatus with two reflectors may be used by aircraft which are insulated in the air, when they desire to act on things or beings located on the ground.

Figure 6:
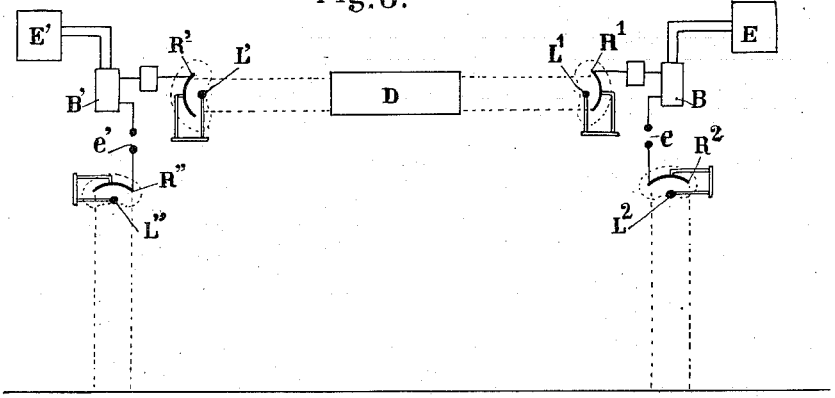
Fig. 6 is a diagram of still another device for use in airplanes.

In order that aircraft may be able to act on other bodies insulated in the air, such as an apparatus D (Figure 6) it is necessary to combine the directions of the pencils of radiations from two or more apparatus as shown, so as to always complete the circuit, this condition being necessary in order that the phenomena may be produced under favourable conditions.

The effects produced at the points touched by the rays may be very different according to the nature of the object which the rays encounter.

Generally, they have at first the common characteristics of very powerful electrical discharges since they possess the particular characteristics of the various radiations emitted.

So far we have obtained by the new process and the new apparatus the following results:

A living being, of the animal kingdom, and particularly a human being suffers a very powerful shock which is equivalent to electrocution.

A vegetable receives an electrical stimulation which contributes to activate its growth and the development of its buds and also to excite its functions of assimilation.

Bacteria of the soil have their multiplication activated and their power of fixing nitrogen developed.

An explosive substance (such as black powder, a nitro explosive or mixtures of detonating gases) is decomposed and is caused to deflagrate if it comes into contact with a metal.

Various other bodies undergo different changes.

One method and apparatus permit electroculture to be easily carried out. Instead of having to construct, as is now necessary, costly stationary installations, it is sufficient for cultivators to purchase conjointly an apparatus of this type mounted on any suitable kind of vehicle and to subject from time to time their cultivation grounds with the pencil of radiations emitted by the apparatus, in order to augment their crops (except those of the leguminous order). Excellent harvests will be obtained at places selected for this electric "spraying" as it may be termed. The reflector, the source of the radiations and the intensity of the current will be determined so as to render practical the treatment of a sufficient radius.

The method and apparatus may be used for military purposes as for defending positions against attacks or for attacking by producing at long distances the electrocution of the enemy and the deflagration of his ammunition.

It may also serve for attacks against aircraft and watercraft.

For military purposes we may also use feebly luminous sources of radiations, or we may render the pencils obscure so as not to reveal to the enemy the position of the emitting apparatus.

We may also use this process and apparatus for the emission of electric energy and its transport to long distances without wires. Various apparatus may be devised for the reception and utilization of the energy emitted.

Figure 7:
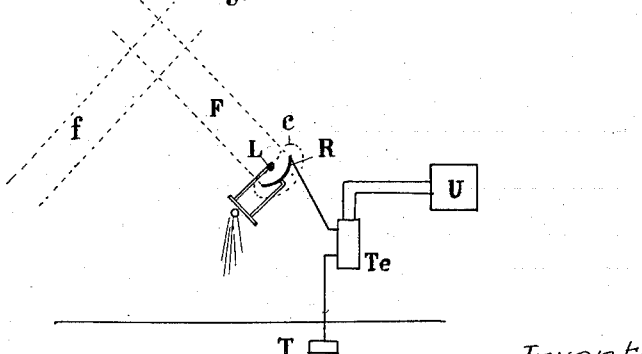
Fig. 7 is a similar view of the device as used for the transmission of electric energy.

The most practical and the simplest consists in a source of radiations placed at the focus of a metal reflector connected to earth (Figure 7). This source emits a pencil F of radiations of short wave length. The pencil is trained in such a way as to encounter the pencil of emission $f$ of energy and to mingle intimately therewith. In the conductor which connects the receiving reflector R to earth are inserted the tension reducers $T^e$ and the apparatus U for utilizing the energy received.

II. Short distance effects

A. *Effects on solid bodies.*—We still describe by way of example the use of the invention for bleaching purposes.

In order to obtain the chemical effects of bleaching, it is not at all necessary to have recourse to as high tensions as in the preceding examples. As a matter of fact, the result has to be attained at a short distance and the radiations emitted under the action of the electric field without the intervention of electric resonance are preferably used.

We prefer alternating currents and the circuit comprises an interruptor, a self inductance and a capacity.

Figure 8:
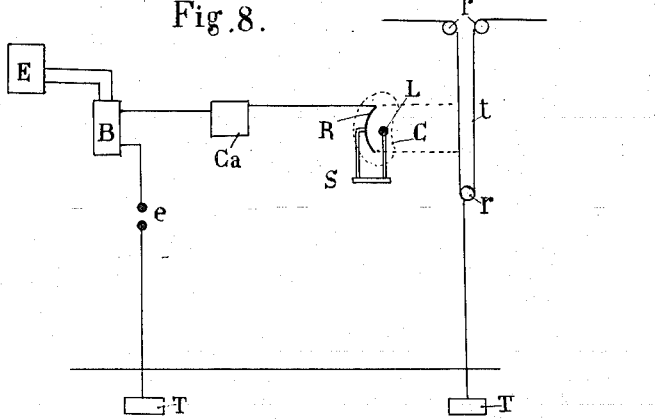
Fig. 8 is a diagram showing the use of the device in bleaching cloth.

For the bleaching of fabrics the apparatus proper is composed of a reflector R (Figure 8) preferably of elongated form, and of a source of luminosity L of like elongated form (such as a rarefied gas lamp of quartz, or a quartz metallic vapour lamp). The reflector and the lamp are properly insulated and placed upon a table. Opposite them over metal rollers r or rollers having metal parts carefully connected to earth T passes the moist fabric t which has previously been washed and degreased.

Figure 9:
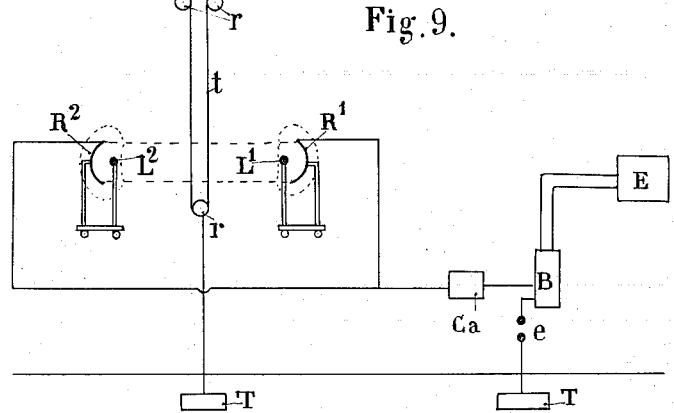
Fig. 9 is a diagrammatic view of a modification of the device shown in Fig. 8.
Figure 10:
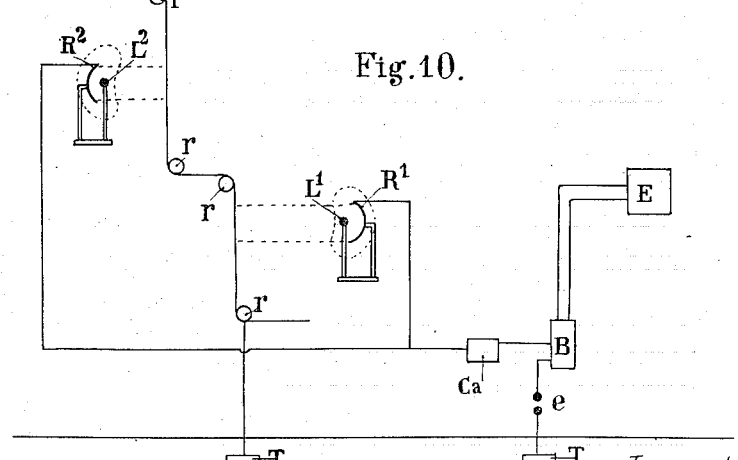
Fig. 10 is a similar view of still another modification.

If necessary two similar apparatus are placed on either side of the table and they may be connected to the same circuit or to separate circuits. The two sets of rays may be caused to act either on the same face (Figure 9) or on both faces of the fabric (Figure 10).

The nature of the source is determined, and the intensity of the current calculated in such a way as to produce by optical resonance the useful radiations and to eliminate the formation of radiations which would be deleterious and unfavourable to the effect sought.

The speed at which the fabric passes over the rollers is carefully determined, so as only to expose it to the action of the radiations for just the time necessary for the purpose in view.

By means of similar or slightly different arrangements we may produce either the bleaching of silk, lace, or straw or of all kinds of other solid substances, care being always taken to cause only such radiations as are useful to act for the length of time which is strictly necessary, and to avoid the formation or the action of deleterious radiations.

B. *Chemical and different effects on liquids.*—We employ preferably alternating currents and as the source of radiations, rarefied gas lamps, or metallic vapour lamps.

The apparatus are of two kinds; some with internal circulation and some with external circulation.

We give by way of example diagrammatic drawings of two forms of apparatus that may be used.

A rarefied gas lamp L with quartz walls (Figure 11) is surrounded by a glass jacket V which leaves a small open space and is provided with tubular openings O' and O², one for the admission and the other for the outlet of the liquid. These tubes may be provided with cocks.

To this jacket is applied a metal band M, of suitable form and composition, connected to one of the poles of an alternating circuit such as has been above described.

Figure 13:
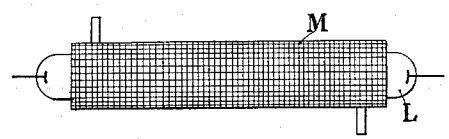
Figs. 13, 14 and 15 show various modified forms of the tube or jacket shown in Fig. 11.
Figure 14:
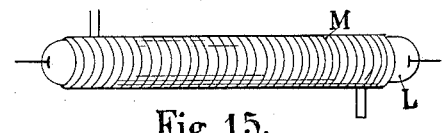
Figure 15:
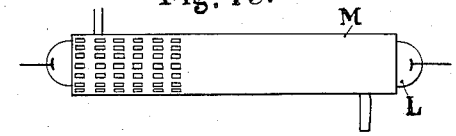

This metal band may either be formed by a continuous plate or by a perforated plate, or by wires in the form of a coil or a strip in the form of a grid or may be variously assembled as shown in Figures 13, 14 and 15. The metal or metals which compose it may be chosen in such a way that to the action of a simple electrical conductor there is added a special chemical or catalytic action.

Figure 16:
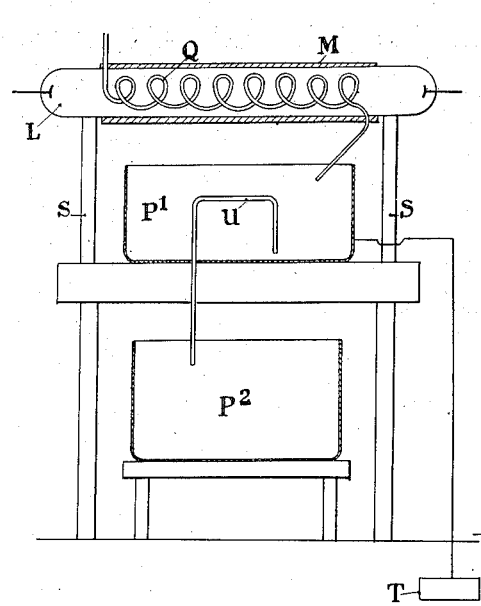
Fig. 16 shows a modified form of the device shown in Fig. 11.
Figure 17:
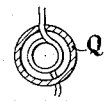
Fig. 17 is a cross section through the tube shown in Fig. 16.

We may also use lamps with internal circulation (Figure 16). A tube of quartz penetrates the upper face of the lamp towards its extremity. It curves inwards when it approaches the axis thereof and then follows a helical line around this axis. When it approaches the other extremity of the lamp it is diverted towards the lower face on the side opposite that on which it enters and emerges.

The tube of quartz may be double walled with a separating vacuum.

A metal band M of variable form and nature surrounds the lamp itself the walls of which are of glass.

If it is desired to cause a chemical or catalytic agent to act on the liquid circulating in the quartz tube, it is necessary to introduce it in a convenient form.

Figure 11:
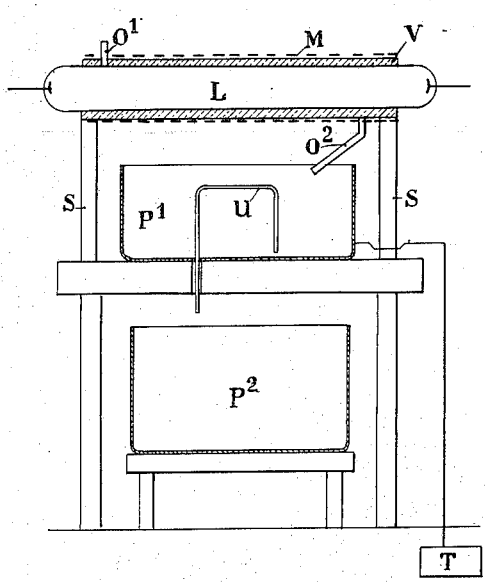
Fig. 11 shows diagrammatically one form of the device as used in the treatment of liquids.
Figure 12:
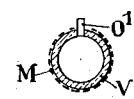
Fig. 12 is a vertical cross section of the tube shown in Fig. 11.
Figure 18:
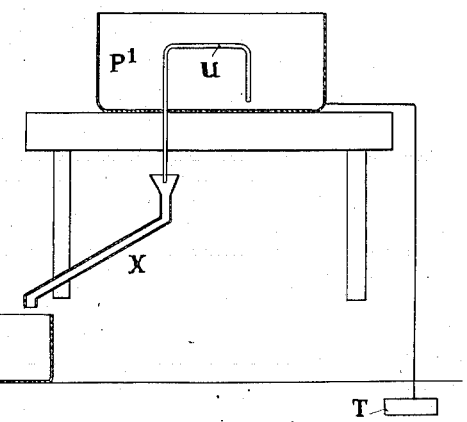
Fig. 18 shows an apparatus in which the device may be employed upon circulating liquid.

This apparatus whether it be for internal or external circulation is carefully insulated on supports s (Figures 11 and 16). It is placed on a table pierced with a circular hole through which passes the lower end of a siphon tube u which starts automatically. The upper end of the tube is placed as shown in the interior of the receptacle P' intended to receive directly the liquid circulating in the apparatus. This receptacle is connected to earth T. Below the receptacle is placed another receptacle P², of larger capacity and easily removable and collecting the liquid from the siphon tube. Instead of this arrangement the liquid may be connected to the collector by an intermediate pipe X (Figure 18).

This apparatus works as follows:

The lamp which comprises the source of lumination is lighted. The current is caused to pass from the circuit into the metal jacket and the desired intensity is given to it so as to act on the source and produce the desired radiations.

It is an easy matter to verify spectroscopically and to determine under what conditions of intensity of the electric currents of the source and of the circuit these radiations appear.

We then admit by the upper tube the liquid to be treated and the continuous rate of flow is regulated in such a way that the jacket in the case of external circulation, or the tube in the case of internal circulation is well filled and no portion of the liquid escapes which has not undergone the desired effect. The rapidity of the reaction determines the rate of flow. The liquid then falls into the upper receptacle connected to earth and as soon as the liquid reaches a certain level the siphon starts. The receptacle thus is emptied almost completely of its contents which pass into the pipe or into the lower receptacle the handling of which can be carried out easily and without danger.

This apparatus enables the decolourization and deodorization of oils to be proceeded with easily and also enables various chemical reactions to be carried out on a large number of liquid substances.

By modifying the nature of the rarefied gas or of the metal vapours of the luminous source, and also the intensity of the current in the circuit, it is possible to obtain different radiations producing very varied and clearly determined effects.

We may also use this process and apparatus for the sterilizing of liquids.

The arrangements described above are given by way of example only. All the details of execution of the method, the forms, dimensions, detail arrangements of the apparatus and the materials employed may vary in all circumstances without in any way effecting the principle of the invention thereby.

We claim:

1. A system for producing radiations that will act at a distance in a powerful way, comprising a source of radiation, a metallic reflector located behind said source, an open electric circuit, and means for supplying electric energy to said circuit, said circuit having one end grounded and the other end connected to the reflector itself, so that it will create an electromagnetic field to act upon said source and cause it to emit radiations in waves of a shorter wave length.

2. A system for producing powerful radiations that will act at a distance in a powerful way, comprising a source of radiation, a metallic reflector located behind said source, an open electric circuit, means for supplying electric energy to said circuit, said circuit having one end grounded and the other end in the form of an aerial connected to the reflector itself to create an electromagnetic field around the same, and means to increase said field and thereby also increase its action upon the source of radiation.

3. A system for producing radiations that will act at a distance in a powerful way, comprising a source of radiation, a metallic reflector placed behind said source, an open electric circuit, means for supplying electric energy to said circuit, said circuit having one end grounded and the other end in the form of an aerial connected to the reflector itself to create an electromagnetic field around it, and means to produce in this circuit the phenomenon of resonance, thereby increasing to its maximum said electromagnetic field and thus also producing a radiation in waves of very short length.

4. A system for producing radiations that will act at a distance in a powerful way, comprising a source of radiation, a metallic reflector located behind said source, an open electric circuit, means for supplying electric energy to said circuit, said circuit having one end grounded and the other end in the form of an aerial connected to the reflector itself to create around it an electromagnetic field, means to produce in this circuit the phenomenon of resonance, in such a way as to increase to its maximum said electromagnetic field, and means for closing the circuit.

5. A system for producing radiations that will act at a distance in a powerful way, comprising a source of radiation, a metallic reflector located behind said source, an open electric circuit, means for supplying electric energy to said circuit, said circuit having one end grounded and the other end in the form of an aerial connected to the reflector itself to create around it an electromagnetic field, means to produce in this circuit the phenomenon of resonance, in such a way as to increase to its maximum said electromagnetic field, and means comprising a source of radiation and a metallic reflector for closing said circuit.

6. A system for producing radiations that will act at a distance in a powerful way, comprising a source of radiation, a metallic reflector located behind said source, an open electric circuit, means for supplying electric energy to said circuit, said circuit having one end grounded and the other end in the form of an aerial connected to the reflector itself, creating around it an electromagnetic field, means to produce in this circuit the phenomenon of resonance, in such a way as to increase to its maximum the electromagnetic field, and means for closing the circuit comprising a source of radiation and a metallic reflector connected to the aerial end of a second circuit, the other end of which is grounded.

7. A system for producing radiations that will act at a distance in a powerful way, comprising a source of radiation, a metallic reflector located behind said source, an open electric circuit, means for supplying electric energy to said circuit, said circuit having one end grounded and the other end in the form of an aerial connected to the reflector itself, creating around it an electromagnetic field, means for producing in this circuit the phenomenon of resonance, in such a way as to increase to its maximum the electromagnetic field, means for closing the circuit, comprising an additional source of radiation, a metallic reflector located behind said additional source and connected to the aerial end of a second circuit, the other end of which is grounded, and a pressure reducing transformer connected in said second circuit.

The foregoing specification of our "Process and apparatus for obtaining new radiations", signed by us this 2nd day of December, 1924.

VICTOR ALBERT HÉNOCQUE.
HENRI SCHMIDT.